Figure 1:
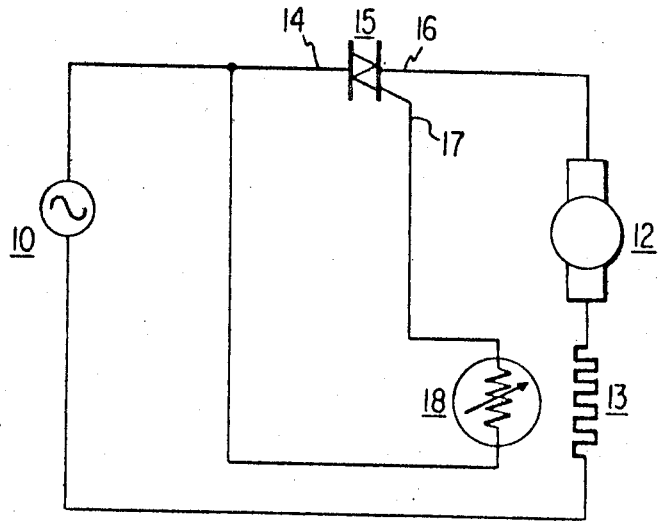

United States Patent [19]

McNulty

[11] 3,846,674
[45] Nov. 5, 1974

[54] OVERCURRENT PROTECTION CIRCUIT INCLUDING A HEAT SENSITIVE ELEMENT AND A THYRISTOR

[75] Inventor: Thomas Charles McNulty, Middlesex, N.J.

[73] Assignee: R.C.A. Corporation, New York, N.Y.

[22] Filed: Aug. 23, 1972

[21] Appl. No.: 174,230

Related U.S. Application Data

[63] Continuation of Ser. No. 841,746, July 15, 1969, abandoned.

[52] U.S. Cl. ............... 317/13 C, 307/305, 317/16, 317/33 SC, 317/41
[51] Int. Cl. ............................................. H02h 7/08
[58] Field of Search.......... 317/13 C, 41, 33 SC, 16; 321/45 DT; 307/305, 305 A

[56] References Cited
UNITED STATES PATENTS
3,211,955  10/1965  Soos................................. 317/13 C
3,562,587  2/1971  Forst................................. 317/13 C

*Primary Examiner*—James D. Trammell
*Attorney, Agent, or Firm*—Edward J. Norton; Joseph S. Tripoli

[57] ABSTRACT

A heat dissipating element is connected in circuit with a load, the current passing through the element being representative of the current supplied to the load. A thermistor is placed in physical proximity with the heat dissipating element and electrically connected in circuit with the control electrode of a thyristor, the conduction state of the thyristor determining the presence or absence of current to the load; the resistance of the thermistor determining the conduction state of the thyristor.

4 Claims, 2 Drawing Figures

AN OVERCURRENT PROTECTION CIRCUIT INCLUDING A HEAT SENSITIVE ELEMENT AND A THYRISTOR

This is a continuation of my copending application Ser. No. 841,746, filed July 15, 1969, and now abandoned.

This invention relates to protection circuits, and, more particularly, to an electronically controlled overload protection circuit for discontinuing the supply of current to a load when it exceeds a predetermined magnitude.

Conventional AC circuits often require the inclusion of circuit breaking means which operate to protect the load from excessive currents. For example, in supplying power to a motor load it is necessary to protect the motor from overload currents which may occur in the event of motor stall or locked rotor operation. Such overload currents will often reach magnitudes of from six to ten times normal load current. Sustained operation under such conditions will cause the windings of the motor under load to burn out. In the prior art, fuses, thermal cutouts and similar protective devices have been successfully employed to overcome this problem. These devices, however, in addition to requiring continual maintenance, must be designed to interrupt full load current, thereby serving to increase their cost.

Accordingly, it is an object of the present invention to provide a simple, inexpensive, electronically controlled protection circuit which can discontinue the supply of current to a load when it attains excessive magnitudes.

A protection circuit adapted to sense overload conditions of a load and discontinue the supply of power thereto, in accordance with the present invention, comprises a condition sensitive element adapted to sense the current supplied to the load and a thyristor connected in circuit with the load, the conduction state of the thyristor determining the current supplied to the load; the conduction state of the thyristor being determined by the condition of the sensing element to cause the discontinuance of current to the load when the sensing element senses an overload condition.

The present invention will be more fully understood upon reading the specification herein along with the accompanying drawing, the FIGURES of which depict protection circuits in accordance with embodiments of the present invention.

Turning first to a description of FIG. 1, the main terminal electrodes 14, 16 of a thyristor element 15, for example, a Triac, are connected in series circuit with a source of alternating current 10 and the load 12 to be supplied. A heat dissipating element 13, for example, a piece of nichrome wire, is connected in circuit with the load 12; the amount of heat dissipated by element 13 being determined by the current through the load 12. As shown in FIG. 1, the nichrome wire 13 is connected directly in series with the load 12 and accordingly must carry full load current. Alternately, the heat dissipating element 13 can be coupled in shunting circuit with the load in which case it need only carry an amount of current which is representative of the current through the load. A thermistor device 18 is connected in circuit with the control electrode 17 and terminal electrode 14 of the Triac 15 and physically located proximate to the nichrome wire 13. In the embodiment represented by FIG. 1, the thermistor 18 exhibits a positive temperature coefficient, i.e., its resistance increases as a function of rising temperature.

In operation, current is supplied in alternate half cycles from the source of alternating current 10 to the load 12 via Triac 15. The Triac is normally switched into conduction, in alternate directions, by a triggering signal applied to control electrode 17, via the triggering circuit which includes thermistor 18, from the source of alternating current 10. During normal operation, the resistance exhibited by the thermistor 18, as qualified by the current passing through the nichrome wire 13, is maintained at a low enough level so as not to impede the application of a triggering signal to the Triac 15 via its control electrode 17. In the event of an overload condition, the amount of heat dissipated by the nichrome wire 13 will increase due to the increased load current thereby causing the resistance of thermistor 18 to increase to a level whereby the control electrode 17 does not see a signal sufficient to trigger the Triac 15 into conduction. In the absence of such a signal the Triac 15 remains nonconductive and the supply of current to the load 12 is discontinued.

Figure 2:
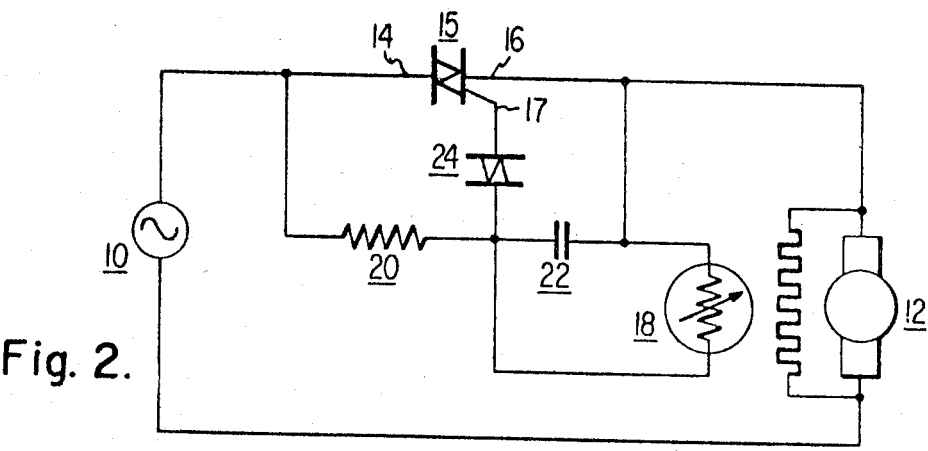

In FIG. 2, an RC time constant circuit comprising a resistor 20 and a capacitor 22 is placed in shunting circuit with the Triac 15 which is in series with the load 12 to be supplied. The control electrode 17 of Triac 15 is connected to the junction formed by resistor 20 and capacitor 22 through a triggering element 24, for example, a diac. Thermistor 18 is connected in shunt with capacitor 22 and physically positioned proximate the heat dissipating element 13. In the embodiment of FIG. 2 thermistor 18 is a negative coefficient thermistor, i.e., its resistance decreases as its temperature increases.

Under normal operating conditions capacitor 22 charges as a function of the applied AC voltage until it reaches a level capable of breaking down the triggering diac 24 to supply a triggering signal to the Triac 15 via its control electrode 17. In the event of current overload, the rise in temperature experienced by the thermistor 18 due to its proximity to the heat dissipating element 13 causes its resistance to decrease to a value which precludes the capacitor from charging to a level sufficient to break down the triggering diac, thereby preventing the Triac from switching into conduction.

By properly selecting the parameters of the various circuit components, circuits can be constructed within the scope of the present invention which will provide regulation within the normal range of operation, in addition to overload protection.

The foregoing descriptions have been directed to circuits wherein the thyristor is positioned in series circuit with the load and switched into a nonconducting operational mode in response to an overload condition. Various additional embodiments, in accordance with the present invention, will become evident in light of the foregoing disclosure, wherein the thyristor is placed in shunting circuit with the load and switched into a conducting operational mode upon sensing an overload, to shunt the current from the load. In such embodiments it is necessary to protect the thyristor from possible damage due to excessive current flow therethrough. This is accomplished by inserting a limiting impedance in circuit with the thyristor and the source.

FIG. 3 shows one such additional embodiment wherein the thyristor is in shunt with the load. In FIG. 3, a source of alternating current 10 has one terminal connected to one end of a current limiting impedance $Z_{LIM}$, and other terminal of source 10 is connected to one main electrode 16 of thyristor 15. The other main electrode 14 of thyristor 15 is connected to the other end of impedance $Z_{LIM}$. Thermistor 18, which in this embodiment exhibits a decreasing resistance with increasing temperature is connected between control electrode 17 and main electrode 16 of thyristor 15. The load 12 is connected in series with the heat dissipating element 13, and the series combination is connected in parallel with $Z_{LIM}$ and thyristor 15.

What is claimed is:

1. An overload protection circuit adapted to sense overload conditions of a load and discontinue the supply of power thereto as a result thereof, comprising:

heat dissipating means adapted for connection to said load, the amount of heat dissipated by said means being proportionate to the current through said load;

a thyristor having first and second main terminal electrodes and a control electrode, said main terminal electrodes adapted for connection in series circuit with said load;

a time constant circuit comprising the serial combination of a resistor and a capacitor, said serial combination being connected across said first and second main terminal electrodes;

means for connecting the point between said resistor and said capacitor to said control electrode; and a negative temperature coefficient thermistor connected in parallel circuit with said capacitor, said thermistor disposed in physical proximity with said heat dissipating means.

2. The circuit according to claim 1 wherein said means for connecting the point between said resistor and said capacitor to said control electrode comprises a diac.

3. An overload protection circuit adapted to sense overload conditions in a load and discontinue the supply of power thereto as a result thereof, comprising:

heat dissipating means connectable in series with said load, the amount of heat dissipated by said means being proportionate to the current through said load;

a thyristor having first and second main terminal electrodes and a control electrode;

a current limiting impedance adapted for connection in series circuit with main terminal electrodes, said impedance and said thyristor being connectable in parallel circuit across said heat dissipating means and said load; and a heat sensitive resistor connected between the control electrode and one main electrode, said resistor being in physical proximity to said heat dissipating means, the resistance of said heat sensitive resistor decreasing to a value sufficient to render said thyristor conductive when the current through said load increases to a predetermined value.

4. The circuit according to claim 1 wherein said heat dissipating means is connected in series circuit with said load.

* * * * *

UNITED STATES PATENT OFFICE
CERTIFICATE OF CORRECTION

PATENT NO. : 3,846,674
DATED : November 5, 1974
INVENTOR(S) : Thomas C. McNulty

It is certified that error appears in the above-identified patent and that said Letters Patent are hereby corrected as shown below:

Attach Figure 3 as shown in the accompanying print.

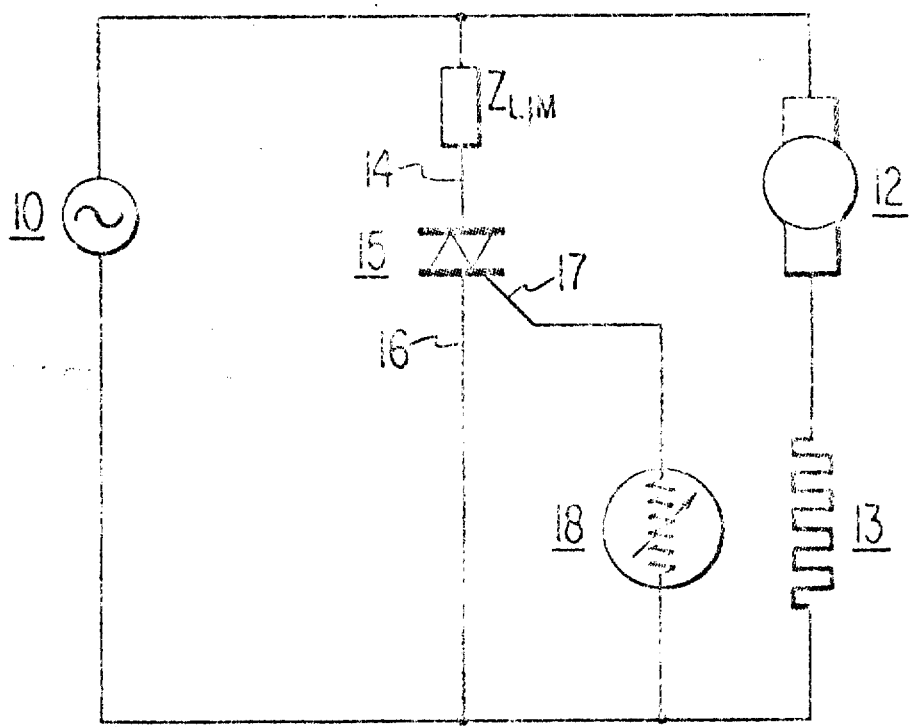

Fig. 3.

Signed and Sealed this thirtieth Day of December 1975

[SEAL]

Attest:

RUTH C. MASON
Attesting Officer

C. MARSHALL DANN
Commissioner of Patents and Trademarks